(12) United States Patent
Colombo et al.

(10) Patent No.: US 7,116,078 B2
(45) Date of Patent: Oct. 3, 2006

(54) PROTECTION SYSTEM OF A VEHICLE BATTERY

(75) Inventors: Paolo Colombo, Alessandria (IT); Marco Bigliati, Trino (IT)

(73) Assignee: ELTEK S.p.A., Alessandria (IT)

( * ) Notice: Subject to any disclaimer, the term of this patent is extended or adjusted under 35 U.S.C. 154(b) by 0 days.

(21) Appl. No.: 10/521,353

(22) PCT Filed: Jul. 30, 2003

(86) PCT No.: PCT/IB03/03408

§ 371 (c)(1),
(2), (4) Date: Jan. 12, 2005

(87) PCT Pub. No.: WO2004/015839

PCT Pub. Date: Feb. 19, 2004

(65) Prior Publication Data

US 2005/0212491 A1  Sep. 29, 2005

(30) Foreign Application Priority Data

Aug. 2, 2002 (IT) ............................ TO2002A0690

(51) Int. Cl.
*H02J 7/00* (2006.01)
(52) U.S. Cl. ..................................................... 320/104
(58) Field of Classification Search ................ 320/104, 320/132; 307/9.1, 10.1, 10.7, 38, 39; 702/63; 180/65.4
See application file for complete search history.

(56) References Cited

U.S. PATENT DOCUMENTS

| 4,644,179 | A | 2/1987 | Pointout et al. |
| 4,902,956 | A | 2/1990 | Sloan |
| 5,089,762 | A | 2/1992 | Sloan |
| 5,332,958 | A | 7/1994 | Sloan |
| 6,242,891 | B1 * | 6/2001 | Parsonage .................... 320/132 |
| 6,249,106 | B1 | 6/2001 | Turner et al. |
| 6,435,294 | B1 * | 8/2002 | Hara et al. ................. 180/65.4 |
| 6,630,749 | B1 * | 10/2003 | Takagi et al. .............. 307/10.7 |
| 2001/0040441 | A1 | 11/2001 | Ng et al. |

FOREIGN PATENT DOCUMENTS

| DE | 100 56 795 A | 5/2002 |
| EP | 1 104 073 A | 5/2001 |
| GB | 2 220 112 A | 12/1989 |
| WO | WO 90 06614 A | 6/1990 |
| WO | WO 98 54811 A | 12/1998 |
| WO | WO-2004015839 | * 4/2004 |

\* cited by examiner

*Primary Examiner*—Pia Tibbits
(74) *Attorney, Agent, or Firm*—Sughrue Mion, PLLC

(57) ABSTRACT

A system for protecting the battery of a vehicle includes a device (1) for electrically disconnecting of connecting the battery (BA) with respect to an electric load (CS). The device (1) includes a switch (20, 21) and a microprocessor control circuit (15). The control circuit (15) includes a unit for calculating a mean value of the voltage of the battery (BA) and comparing it with a threshold value, in order to control the switch (20, 21). The threshold value is variable as a function of the ambient temperature and the time of inactivity of the motor. The switch includes a bistable electromagnetic arrangement, capable of passing from a first to a second stable condition following a pulse generated by the control circuit (15).

21 Claims, 8 Drawing Sheets

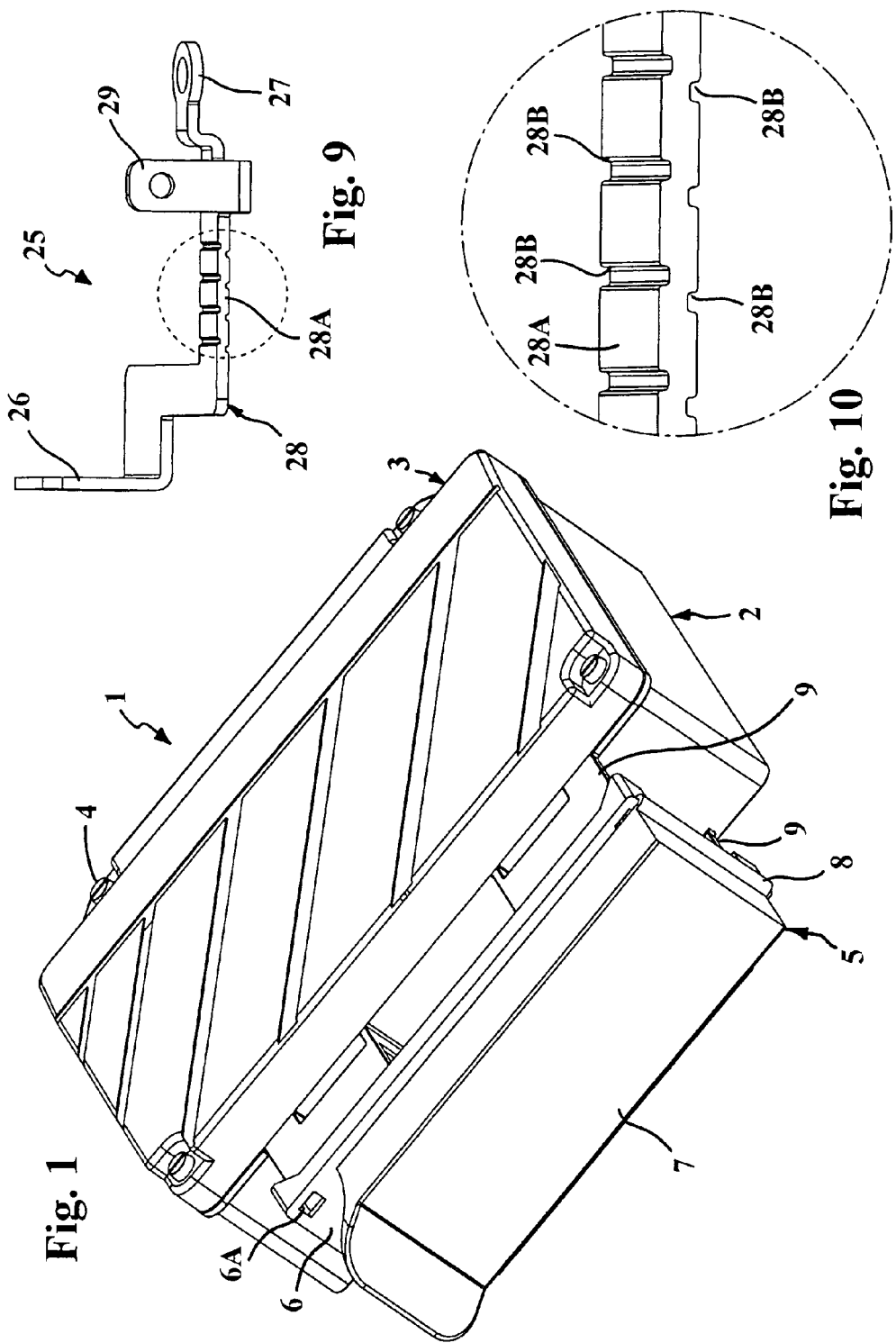

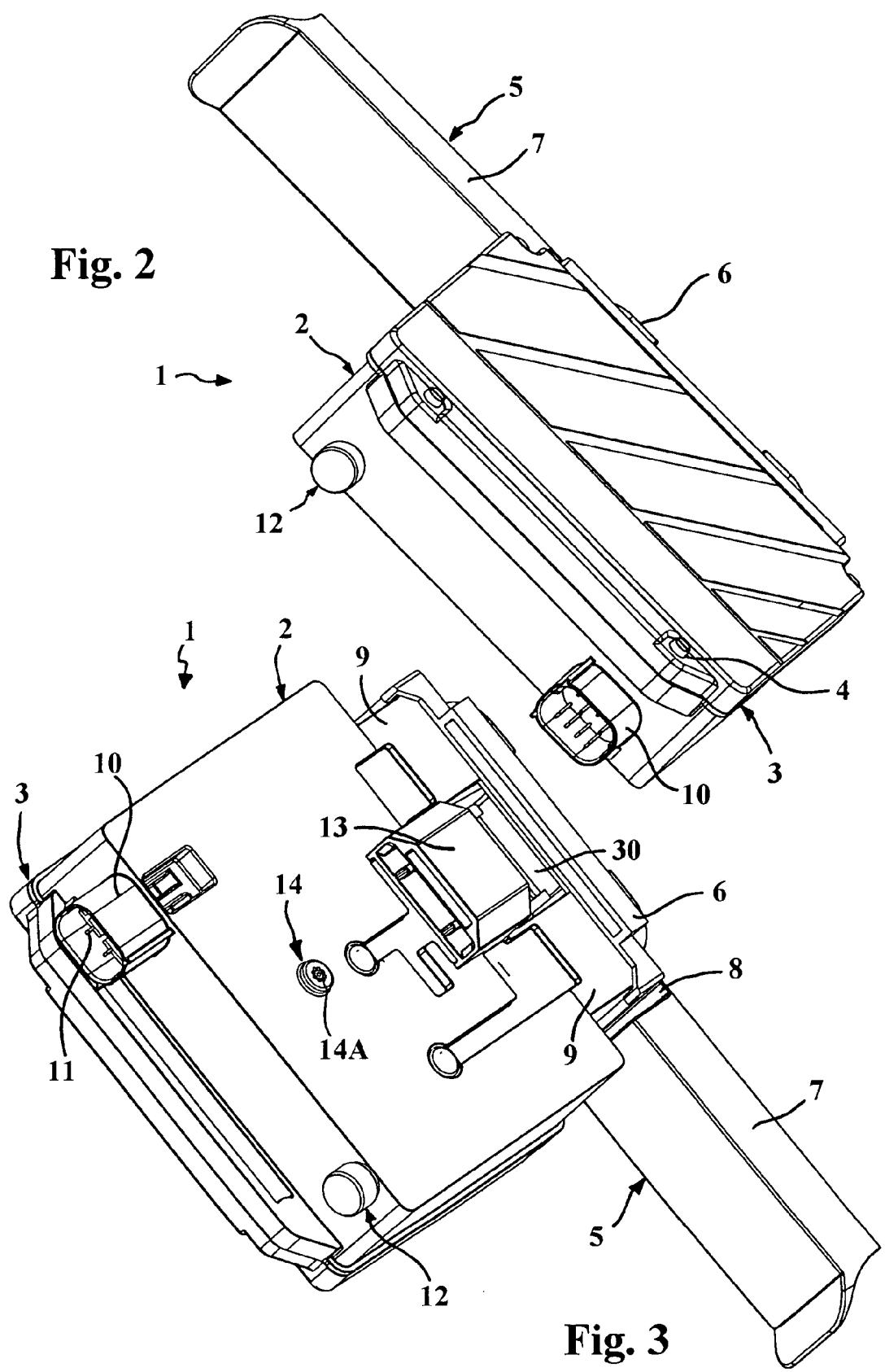

PROTECTION SYSTEM OF A VEHICLE BATTERY

BACKGROUND OF THE INVENTION

1. Field of the Invention

This is a National Stage entry of International Application PCT/IB03/03408, with an international filing date of Jul. 30, 2003, which was published under PCT Article 2 1(2) as WO 2004-0 15839 Al, and the complete disclosure of which is incorporated into this application by reference.

The present invention refers to a system for protecting the battery of a vehicle.

2. Description of the Related Art

Some vehicles are equipped with at least a battery, in order to allow for the ignition of a respective motor, as well the supply, also with the motor off, of certain electric equipments of the vehicle (such as position lights, courtesy lights, emergency lights, a door-lock system, an anti-theft system, etcetera); the vehicle is usually equipped with an alternator, actuated by the motor and operative for supplying an electric current for recharging the battery.

It may happen into practice that, with the motor off, a given electric load of the vehicle remains supplied for a given time, being sufficient for lowering the level of electric energy of the battery below the minimum threshold necessary for carrying out the ignition of the vehicle's motor; such a circumstance may happen, for instance, when the vehicle's lamps are unintentionally left switched on for a long period of time.

In order to avoid such a disadvantage, and therefore allow the battery to keep a minimum charge threshold being sufficient for allowing motor ignition, there have been proposed proper devices operating for disconnecting in an automatic way the battery from one or more associated electric loads, should the charge state of the battery tend to fall below a predefined safety level.

A device of the indicated type is described, for example, in U.S. Pat. No. 4,902,956, which comprises a control circuit capable of detecting the state of charge of the battery and consequently control a solenoid, the latter being operative for causing commutation to the open position of an electric contact, in order to isolate the battery from the electric loads of the vehicle. In such a solution, the commutation of the contact in the closed position has to be done manually, by means of a respective mechanical push-button. Such a solution is scarcely efficient and uncomfortable for a user which, following the safety intervention of the device, will be forced to open the bonnet of the motor vehicle in order to reach the aforesaid manual actuation device.

Document U.S. Pat. No. 5,089,762 describes a similar safety device wherein the disconnection contact of the battery is actuated towards the open position by means of a small electrical drive. The detecting and control circuit of the device also comprises means for detecting an attempt by the user to start the vehicle; in the case in which, following the safety intervention, such a start attempt is detected, the control circuit actuates the small drive in a sense being opposite to the previous one, so as to bring back the contact in the respective closed position, wherein the battery is connected to the electric loads of the vehicle. Such a solution, besides being complicated and critical, implies the provision of control means of the small electric drive actuating the contact, with the relevant additional costs; the small drive producing the device's intervention also causes a certain absorption of electric current and increases the overall dimensions of the device.

In the case of U.S. Pat. No. 6,249,106 the safety device comprises instead a plurality of electronic switches, which are configured for passing from a respective open condition to a respective closed condition, in the former the electric load being connected to the battery, whereas in the latter the electric load is disconnected from the battery. The electronic switches are controlled by a gate circuit, upon receiving a signal from a microprocessor which is part of the control and detecting circuit. The use of solid state switches, as in U.S. Pat. No. 6,249,106, is decidedly expensive and is a source of possible criticalities in the operation of the device, due to their intrinsic "fragility" and the high sensitivity to voltage peaks or short circuits, unless suitable expedients are foreseen, that however further increase the manufacturing cost.

The devices of the indicated type are also occasionally subjected to severe environmental conditions, and typically undergo high temperatures being present in the motor space and conditions of cold or of elevated humidity, for instance during winter, rain periods, etcetera.

The repeated thermal cycles or also the long exposure to a high level of heat can determine significant increases of pressure within the casing of the device, that it is usually hermetically sealed, with consequent mechanical stresses on the same and likely deformations or breakages; even if the casing it is theoretically hermetically sealed, humidity infiltrations may occur, above all in correspondence of the points in which the terminals for the electric connection of the device protrude out of the casing.

It must then be considered that, in the case of dead battery, vehicle's ignition must be carried out through an auxiliary battery which must be surely charged, or through a workshop starter; under such circumstances, the auxiliary battery or the starter must be connected in parallel to the discharged battery of the vehicle, by means of power cables usually having clamp terminals. Such an operation is often uncomfortable, above all because of the difficulty of connecting one of said power cables to the positive polarity of the discharged battery.

SUMMARY OF THE INVENTION

The present invention has the general aim of solving one or more of the afore said drawbacks.

Within this frame, a first aim of the invention is that of realizing a device of the indicated type being of simple and cheap manufacturing, reliable and easy to use for an user.

A second aim of the invention is that of realizing a device of the indicated type whose structure is sparely affected by deformations due to exposure to heat or severe thermal cycles.

A third aim of the invention is that of realizing a device of the indicated type whose casing has an increased tightness to humidity and infiltrations in general.

A third aim of the invention is that of realizing a device of the indicated type that allows for making easier the connection of a cable to the positive pole of the battery of the vehicle, in view of motor ignition when the battery is discharged.

These and other aims are attained, according to the present invention, by a system for protecting the battery of a vehicle, comprising a device of the above indicated type, having the features of the annexed claims, which are to be meant as an integral part of the present description.

BRIEF DESCRIPTION OF THE DRAWINGS

Further aims, features and advantages of the present invention will emerge from the detailed description that follows and the annexed drawings, being supplied as a mere not limiting example, in which:

FIG. 1 is a perspective view of a protection device manufactured in accordance with the invention, with a covering element in a respective closed position;

FIGS. 2, 3, 4 e 5 are perspective views from different angulations of the device of FIG. 1, with the covering element in a respective open position;

FIG. 9 is a perspective view of a terminal of the protection device according to the invention;

FIG. 10 is a detail of the terminal of FIG. 9, in an enlarged scale;

DESCRIPTION OF PREFERRED EMBODIMENTS OF THE INVENTION

In FIGS. 1–8, reference 1 indicates as a whole a protection device manufactured in accordance with the teachings of the present invention.

Figure 7:
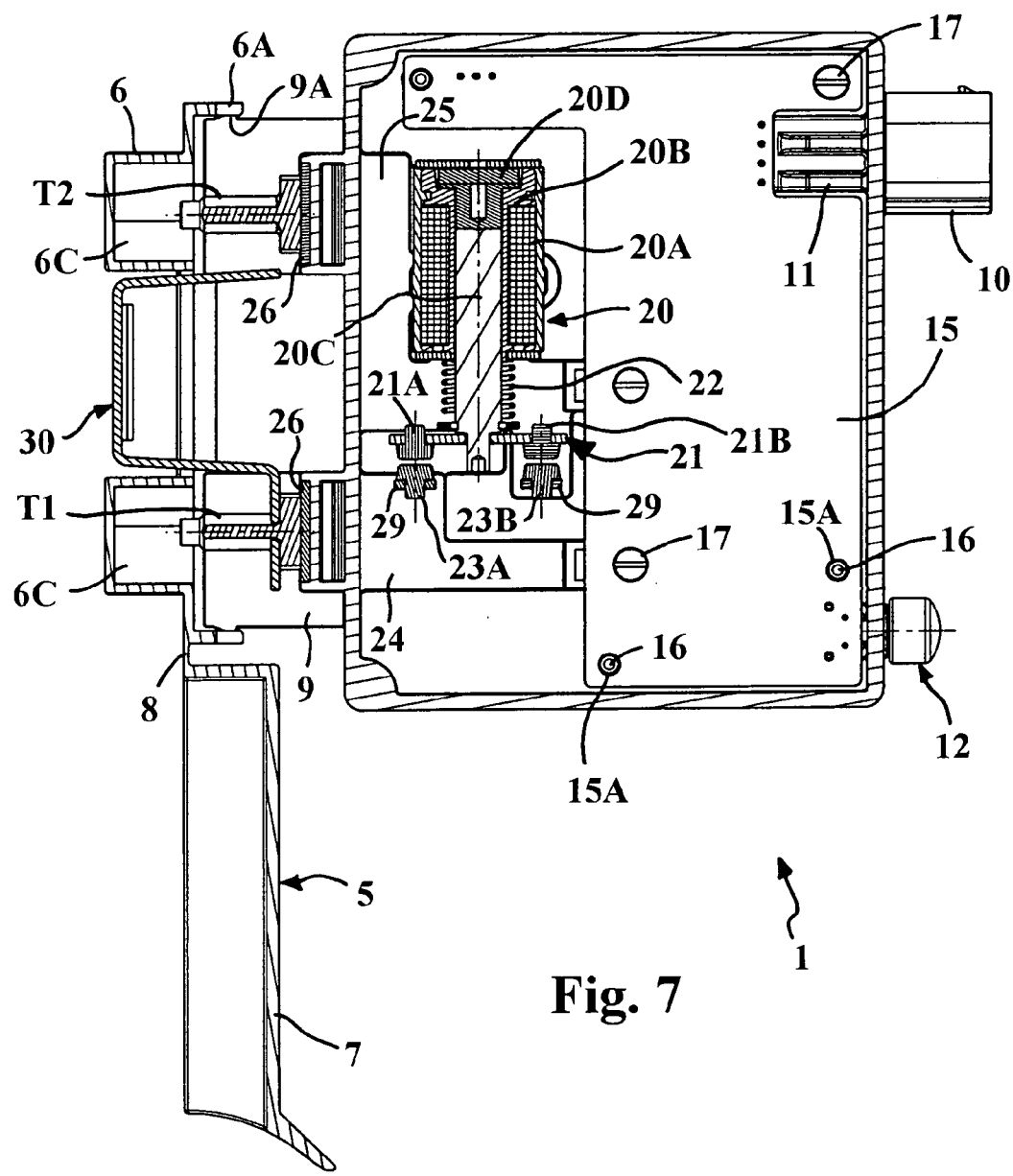
FIG. 7 is a section according line VII—VII of FIG. 6.
Figure 8:
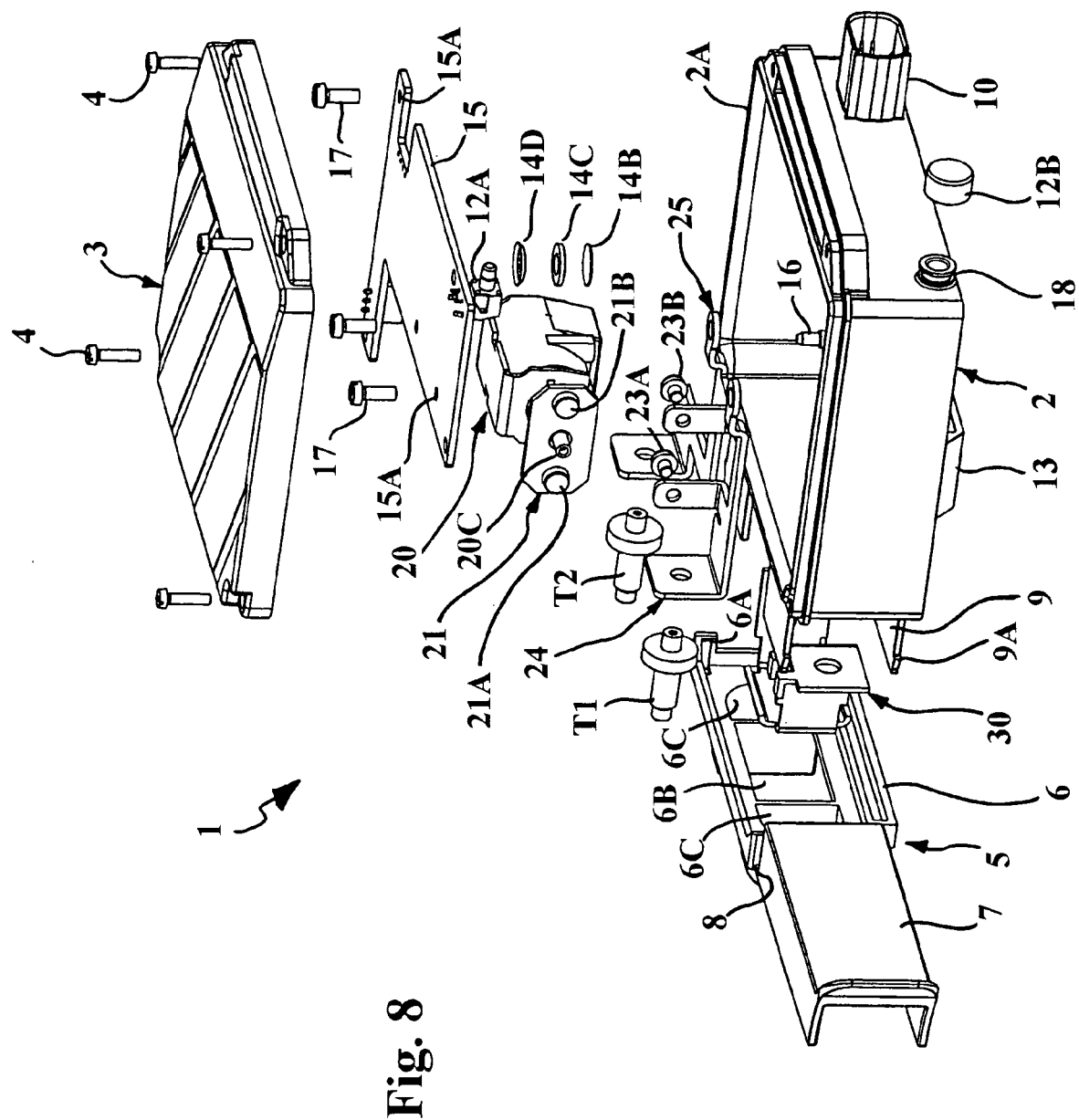
FIG. 8 is an exploded view of the device of FIGS. 1–7.

The device 1 has a casing formed by two parts made of molded thermoplastic material, and namely a lower box-like body 2, being upwardly open, and a respective cover 3; in the lower surface of cover 3 a perimetrical seat is defined, for housing a sealing gasket, the latter and the respective seat being not visible; cover 3 is fixed on the body 2 by means of screws 4 of other known fixing means, so that a perimetrical projection of the same body, indicated with 2A in FIG. 8, results in being inserted in the cited seat, for maintaining the respective gasket pressed. Reference 5 indicates as a whole a covering element for two connection terminals of the device, indicated with T1 e T2 in FIGS. 7 and 8; element 5, which is in a single piece of molded thermoplastic material, comprises a hooking and protecting portion 6 and a closure portion 7, the two portions being mutually joined by means of an elastically deformable portion 8, which operates as a hinge; by virtue of the presence of the cited hinge portion 8, portion 7 can be folded over portion 6, in order to cover terminals T1 and T2, in a closed position as shown in FIG. 1.

From one side of body 2 two couples of parallel wings depart, some of them being indicated with 9, each wing having at the free end a hooking tooth 9A, visible in FIGS. 7 and 8; at the other side, on part 6 of the covering element 5 there are defined respective hooking seats 6A, some of them being visible in FIGS. 1, 4, 5, 7 and 8, that are designed for receiving and elastically keeping teeth 9A, in order to perform the mechanical connection between element 5 and body 2.

A tubular projection 10, visible in FIGS. 2 and 3, protrudes from the side of body 2 opposite to the one to which the covering element 5 is fixed; terminals 11 protrudes into projection 10; such a projection substantially forms a male connector, which is an electric connection towards the electrical system of the vehicle on which device 1 is mounted; such a male connector is designed to receive a respective female connector (not represented), to which electric cables are connected, for interfacing the device with some electric devices of the vehicle, in order to acquire respective signals (for example: positive of ignition key, alternator, crash sensor, emergency lights, etcetera). The same connector (or a similar additional connector, not represented), could comprise further electric terminals for the connection of electric cables necessary for the transmission and/or reception of data towards and/or from other devices of the motor vehicle, such as, for example, an electronic unit for motor control.

On the side bearing connector 10, 11, a push-button 12 is further provided for likely manual reinstatement of the device 1, whose embodiment will be described later on.

In the bottom side of body 2 a bracket 13 is defined, used for anchoring the device 1 to a fixed structure of the motor vehicle. Bracket 13 could be realized as an integral part of body 2, in thermoplastic material, or made of metal, in order to be used as a ground terminal, connected to the negative potential of the battery of the vehicle.

On the bottom side of body 2 a hollow cylindrical projection is also defined, indicated with 14 in FIG. 3, having in the respective end wall a plurality of small through-holes 14A; such a projection 14 is part of a membrane vent device that, as represented in FIG. 8, comprises
- a membrane 14B of a material being permeable to air and impermeable to water and humidity, such as, for example, Gore-Tex® or Teflon® or other material having similar characteristics,
- a washer made of elastic material 14C, and
- a fixing disc 14D made of rigid material, having a plurality of holes similar to those of projection 14.

Membrane 14B is inserted within projection 14 from the inside of body 2, and washer 14C is then arranged on it; finally, from the same side of projection 14, disc 14D is coupled, for instance snap fitted, so that membrane 14B is elastically pressed by means of washer 14C on the bottom of projection 14 having the holes 14A.

Within body 2 there is mounted the micro-controller control circuit of the device, indicated schematically with 15 in FIGS. 7 and 8, comprehensive of a board bearing the various electrical/electronic members, not visible in the figures.

Board of circuit 15 has a plurality of through-holes, some of which indicated with 15A in FIGS. 7 and 8; some holes 15A are destined to receive the ends of respective positioning pins 16 raising from the bottom of body 2, while some other holes 15A receive respective screws 17 for anchoring the cited board to the same bottom. The electromechanical part of push-button 12 is fixed to the board of circuit 15, from which a small actuation shaft 12A protrudes, visible in FIG. 8, which can slide linearly; with the board in position, shaft 12A passes through a hollow projection, indicated with 18 in FIG. 8, protruding outside the respective sidewall of body 2; such a projection 18 is equipped at the free end with a perimetrical relief, onto which a key 12B in elastic material, such as rubber, is hooked up; elastic coupling between the key 12 and the projection 18 is sealed, and a depression on the former causes a sliding of the small shaft 12A for producing actuation of push-button 12.

At the bottom of body 2 there is fixed, with known means, an electromagnet 20, comprising an inductor winding or coil, indicated with 20A in FIG. 7, formed by an electrically conductive thread wound on a hollow spool, and supplied with a magnetic yoke 20B; the ends of winding 20A are electrically connected to two respective terminals, not visible in the figure, connected to the control circuit 15; within the cited spool an armature or movable core 20C of the electromagnet 20 is partially inserted; with 20D a permanent magnet is indicated, arranged in the rear zone of the electromagnet 20.

At the end of the movable core 20C protruding out of the electromagnet 20 a bridge contact 21 is fixed, constituted by a metallic plate to which two knobs 21A, 21B are associated, made of electrically conductive material; between the body of the electromagnet 20 and contact 21, on the core 20C there is a spiral spring 22, which is thus operative for pushing the core 20C towards the outside of the respective hollow spool. In such a way, the two knobs 21A and 21B are maintained into contact with two correspondents conductive knobs 23A, 23B, each one being associated to a respective electric connection element 24, 25, made of metallic material, preferably configured as a shaped and folded metallic strap o small bar.

The bridge contact 21 is preferably free to move with respect to the movable core 20C that supports it, in particular with the aim of improving the contact between the respective knobs 21A, 21B and the conductive knobs 23A, 23B.

Elements 24 and 25 are provided for electrically connecting terminals T1 and T2, respectively, to the control circuit 15; even if they have an overall shape different from each other, elements 24, 25 have similar functional portions; in particular, as it can be seen in FIG. 9 where element 25 is represented, reference 26 indicates a first end portion, onto which the respective terminal T1 or T2 is fixed;

reference 27 indicates a second end portion, for the connection to circuit 15;

reference 28 indicates a median portion, than extends between the end portions 26 and 27;

reference 29 indicates an intermediate contact portion, to which a respective knob 23A or 23B is associated.

In the exemplified case, portion 28 extends horizontally, portions 26 and 29 extend vertically with respect to portion 28 and portion 27 extends horizontally, but at a level of height slightly higher than portion 28. It should be noticed that the connection between portions 27 of elements 24, 25 and circuit 15 is preferably obtained through flexible electric conductors, for instance configured as small cables, in order to avoid possible problems due to vibrations of body 2.

Elements 24 and 25 of FIGS. 7 and 8 are provided for being partially wrapped or covered by thermoplastic material constituting the box-like lower body 2; in particular, horizontal portion 28 is destined to be "immersed" into the bottom wall of body 2, so that portion 26 protrudes from such bottom wall outside of body 2, while portions 27 and 29 protrudes within the same body. According to an important aspect of the invention, and as shown in FIG. 10, on at least a part 28A of portion 28 there are transverse recesses 28B and/or protrusions, parallel to each other, obtained in a known way; during manufacturing, thermoplastic material is co-molded with, or over-molded on, such a part 28A, in particular a material of the type able to perform a seal with respect to said part 28A, said thermoplastic material being the same material that constitutes the lower body 2. In a possible variant embodiment, moreover, a first material can be preliminary co-molded on the connection elements 24, 25, for example with the purpose of improving the sealing and/or favoring insertion of the same elements in the mold subsequently used for shaping the lower body 2; the second material forming body 2 is then capable of wrapping at least partly the first material. Following molding of body 2, portion 28 of elements 24, 25 is preferably wrapped or covered by 5–7 millimeters of thermoplastic material.

Said particular realization allows, by virtue of the presence of the labyrinth path formed by recesses 28B, to eliminate the risk of possible infiltrations of water and humidity towards the inside of device 1, from portions 26 to portions 27 of the connection elements 24, 25, so guaranteeing a waterproof sealing.

On the other hand, the presence of the membrane vent device 14–14D allows for avoiding significant increases of pressure within the casing of the device 1, and therefore possible deformations or breakages deriving from such type of mechanical stress; the fact that membrane 14B is made of Gore-Tex® or Teflon® or other material having similar characteristics allows for to avoiding entry of water and humidity within the device, allowing however air to pass through.

Figure 4:
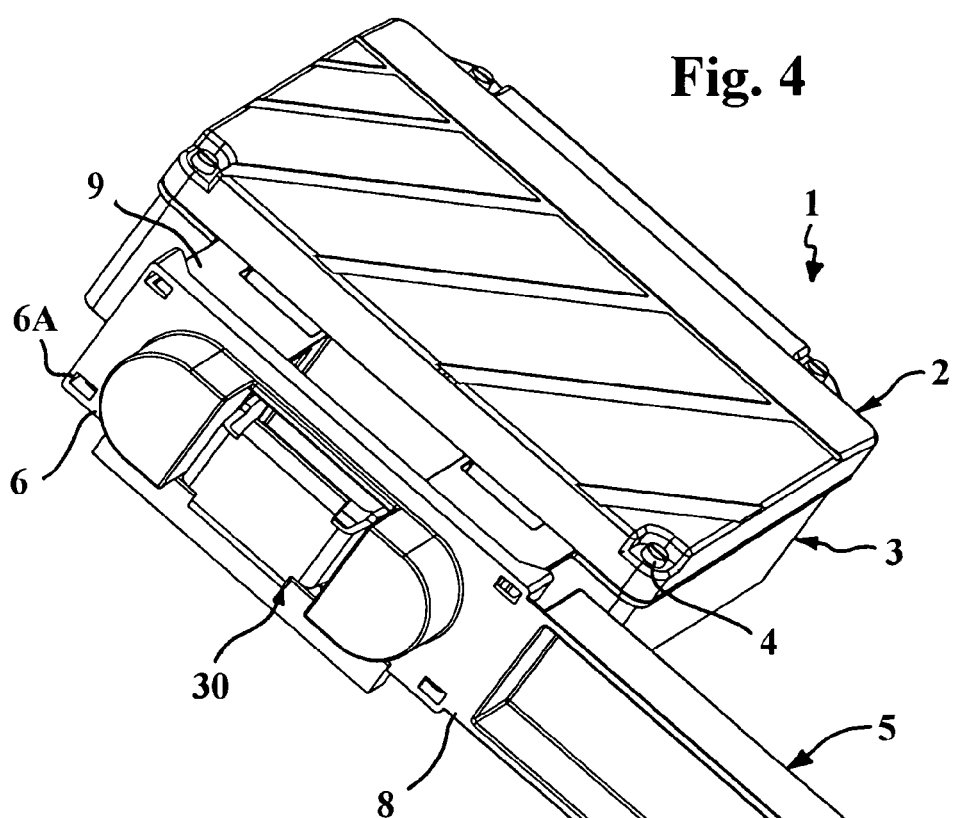
Figure 5:
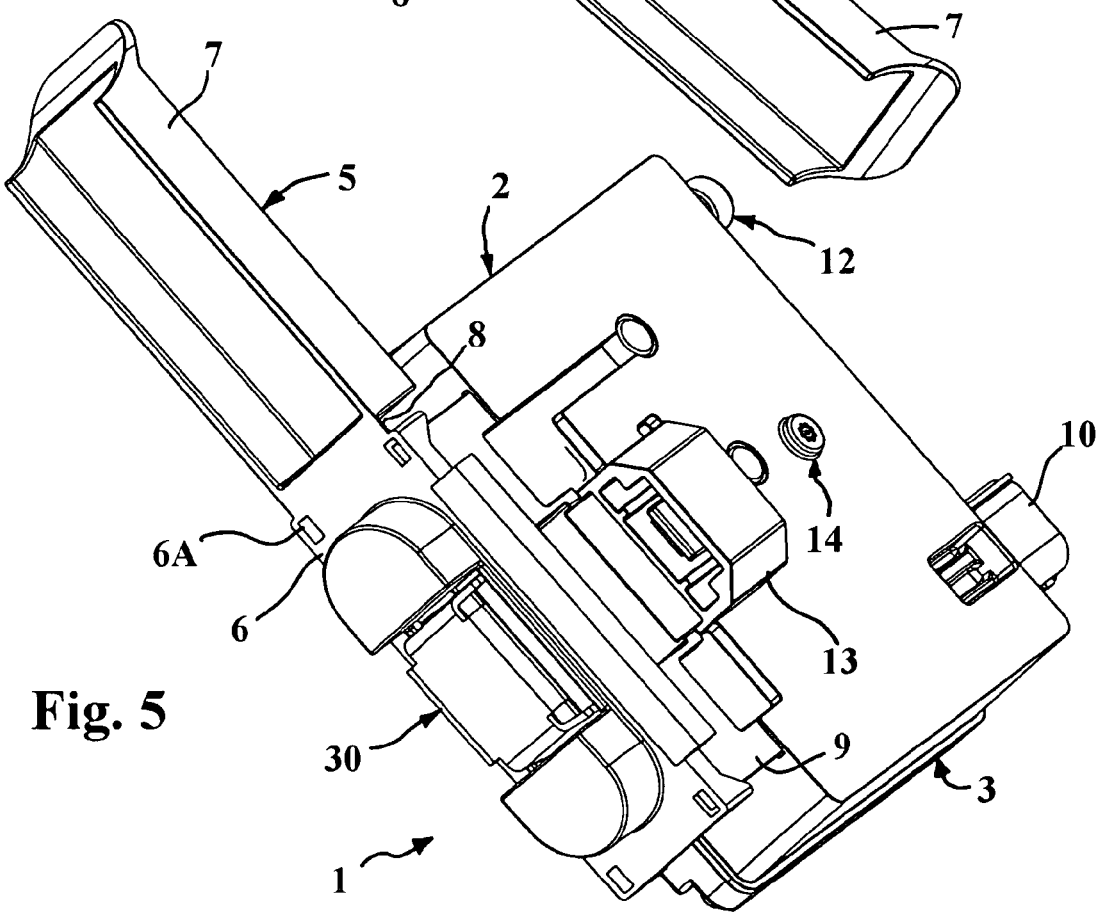
Figure 6:
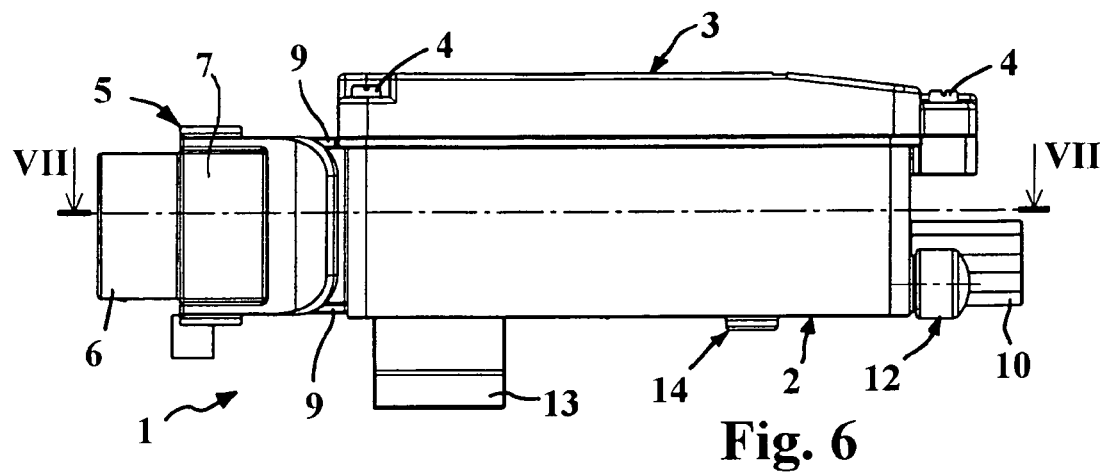
FIG. 6 is a side view of the device of FIGS. 2–5.

Turning again to FIG. 8, reference 30 indicates an electric terminal, made from a sheet in metallic material fixed to terminal T1; terminal or sheet 30 is shaped for protruding in an aperture 6B passing through part 6 of covering element 5, for being accessible after part 7 has been brought to the respective open position, as it is visible for example in FIGS. 4, 5 and 7.

According to an important aspect of the invention, such a protruding part of the sheet or terminal 30 is destined to form a point of attachment for the clamp of a common emergency electric cable, i.e. of the type used in order to start the motor of a vehicle, when the charge level of the respective battery has fallen below the minimum level being necessary for allowing motor ignition. According to such an aspect of the invention, therefore, device 1 directly integrates a contact, being just represented by sheet 30, for the so-called "jump start", i.e. ignition of the vehicle's motor by means of connection to an auxiliary start system, that can be constituted, for example, by another vehicle with running motor, a 24V battery or a workshop starter.

Reference 6C finally indicates two housings of part 6 of covering element 5, defined at two sides of opening 6B and distinct from the latter, within said housings being positioned terminals T1 and T2.

Figure 11:
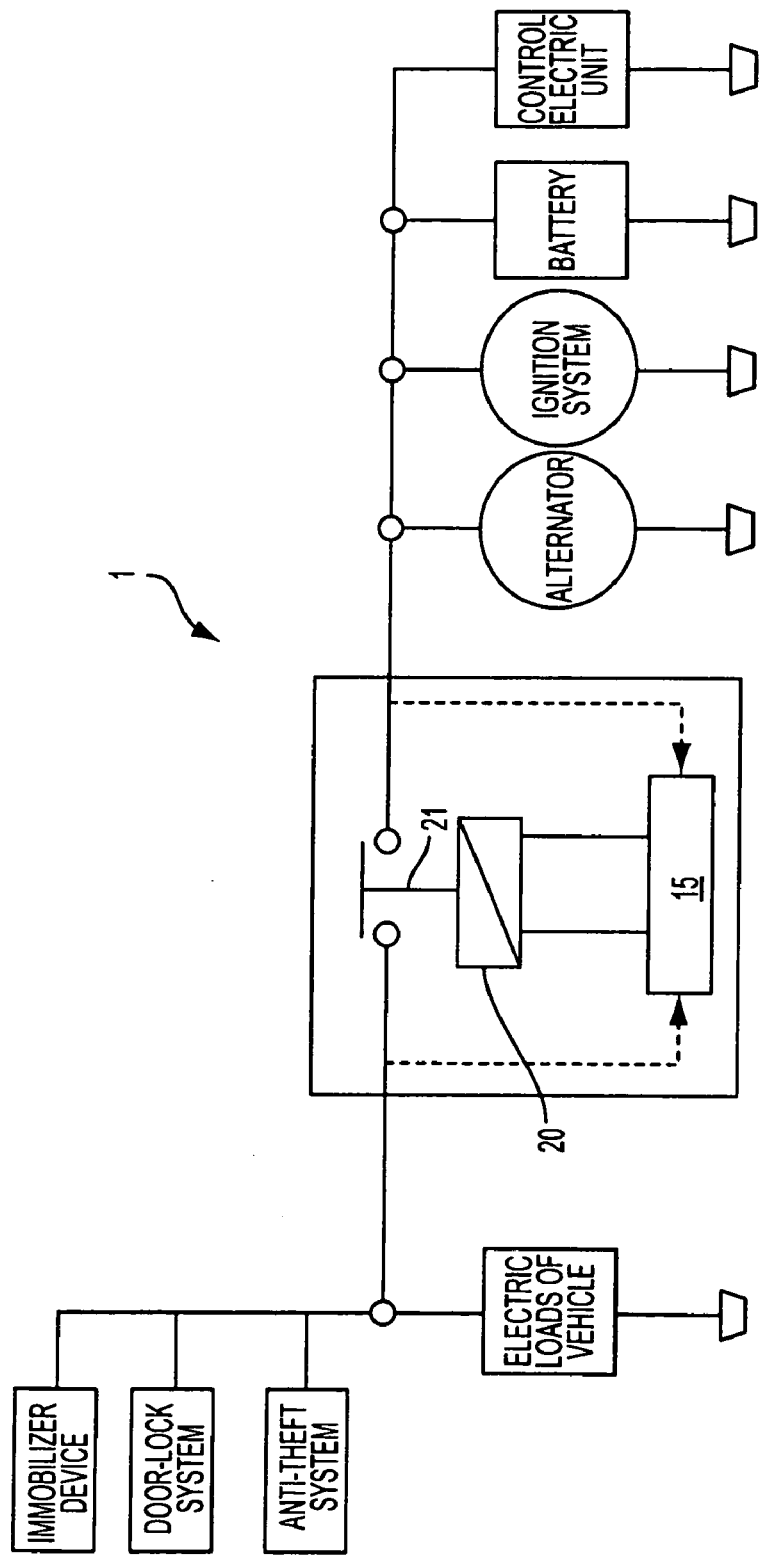
FIG. 11 is a simplified electric diagram showing a possible connection mode of the protection device according to the invention.

Device 1 is destined to be connected in series to the battery, through terminals T1 and T2, between the positive pole of the battery and at least some electric loads of the vehicle. To this purpose, FIG. 11 shows a possible way of connection of the device 1. In such a figure, BA indicates the battery of the vehicle, MA its starter, AL its alternator and ECU an electronic unit for controlling the vehicle's motor. Reference CS then indicates the various electric loads of the vehicle, among which there may be comprised an immobilizer device CS1, a door-lock system CS2 and an anti-theft system CS3.

In the case exemplified in FIG. 11, device 1 is installed on the vehicle downstream of the derivation for the alternator AL, the starter MA and the control electronic unit ECU; device 1 is connected to battery BA and starter AL by means of short cable lengths having a large section and to the starter; starter MA is connected to the alternator AL by means of a cable of more reduced section.

Device 1 is provided for performing a safety intervention by opening the bridge contact 21 whenever the battery voltage falls below a predetermined threshold, with the motor off; to this purpose, contact 21 is a bistable contact, being maintained in the open condition through the action of spring 22, that pushes knobs 21A, 21B into contact with knobs 23A, 23B. Should the control circuit 15 detect the fall of the battery voltage below the aforesaid threshold, the same circuit generates a supply pulse for the electromagnet 20, in order to induce a back movement of core 20C capable of overcoming the action of spring 22; core 20C is therefore maintained in the back position, i.e. in the condition of the bridge contact being open, by means of the magnetic action produced by magnet 20D, in absence of electric supply.

In the case in which the reinstatement of the device is then necessary, i.e. the closure of contact 21, control circuit 15 provides for generating a new pulse, being of opposite polarity with reference to the previous one, so as to overcome the force of magnet 20D and carry core 20C outside of the field of attraction exercised by magnet 20D; the force of spring 22 then brings back and maintains core 20C, and therefore contact 21, to the original position of closed electric circuit.

As it can be seen, therefore, according to an important aspect of the invention, device 1 is equipped with a commutation arrangement with electromagnetic actuation of bistable type, where the passage between the two stable conditions of the arrangement can be obtained through a simple electric pulse; said arrangement, in the illustrated case, is embodied by a bistable relay, formed by the electromagnet 20 with its components 20A–20D, the movable bridge contact 21 and the spring 22.

Logic of operation of the control circuit 15 provides for disconnecting the electric loads with the motor off, by measuring or estimating the battery voltage, the discharge rate of the battery (estimation based on the speed of decrease in the time of the battery voltage), the ambient temperature.

Figure 12:
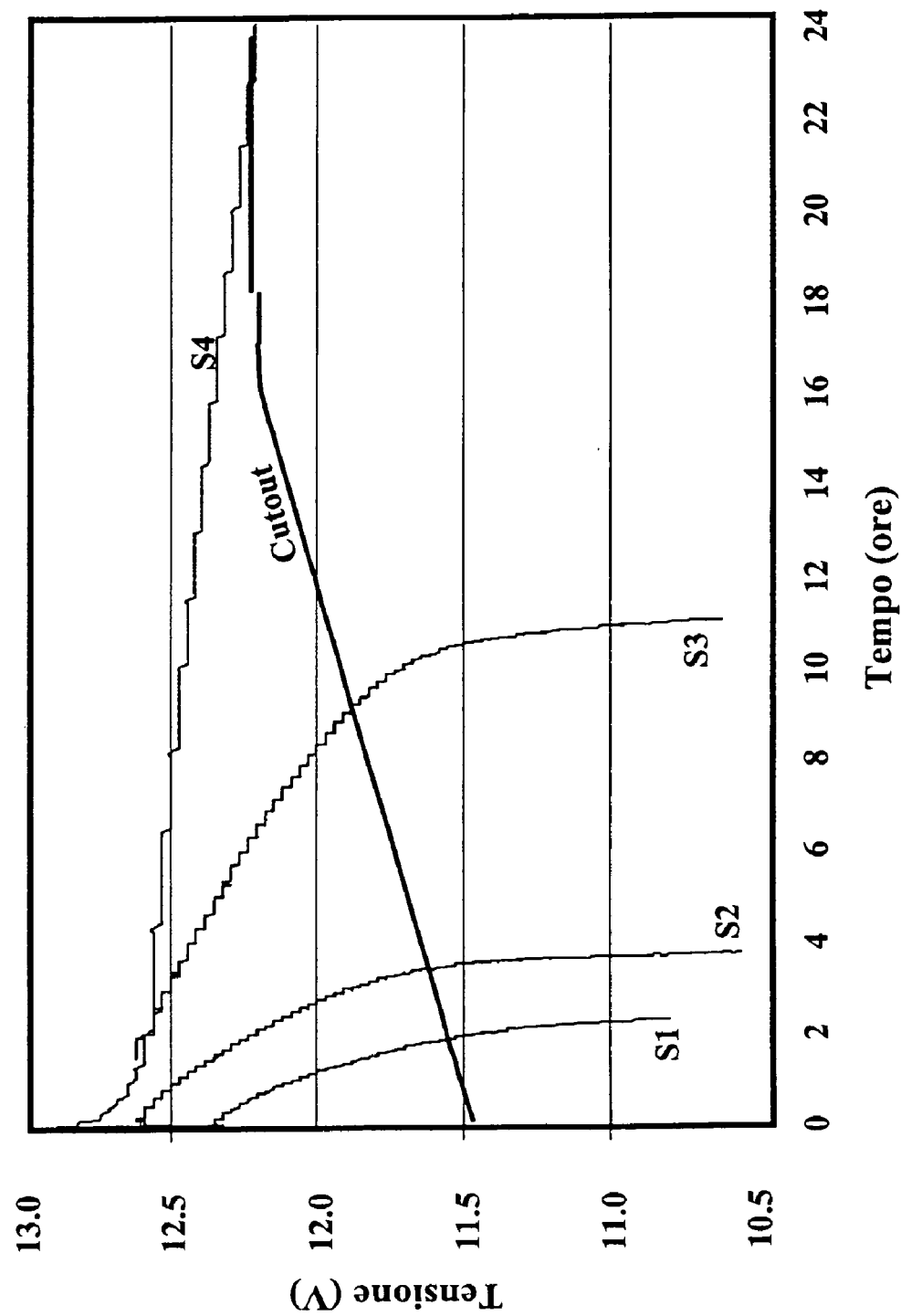
FIG. 12 is a graph showing, by way of example, some curves of decrease in time of the voltage of a battery, as a function of the current absorbed by the respective connected electric loads, at a temperature of 25° C.

The higher is the current absorbed by the electric loads, the quicker is the decrease of the state of charge of a battery, and consequently of its voltage. FIG. 12 shows, to this purpose, as a pure example, some curves of voltage decrease, in the time (being expressed in hours) and in function of the current absorbed by the electric loads. In such a figure, curves S1, S2, S3 and S4 relate respectively to absorptions of 25, 15, 5 and 1 Amp V. The curve called Cutout represents instead the minimum level of voltage that the battery should have, in order to safeguard the ability to start the vehicle. The curves of voltage decrease represented in FIG. 12 relates to an ambient temperature of 25° C.; it should be noticed, to this purpose, that at cold temperatures (for example below 0° C.) or hot temperatures (for example above 40° C.), the state of charge of the battery varies and, consequently, curves being similar to those represented in FIG. 12 can be defined for extremely low or extremely high temperatures.

Figure 13:
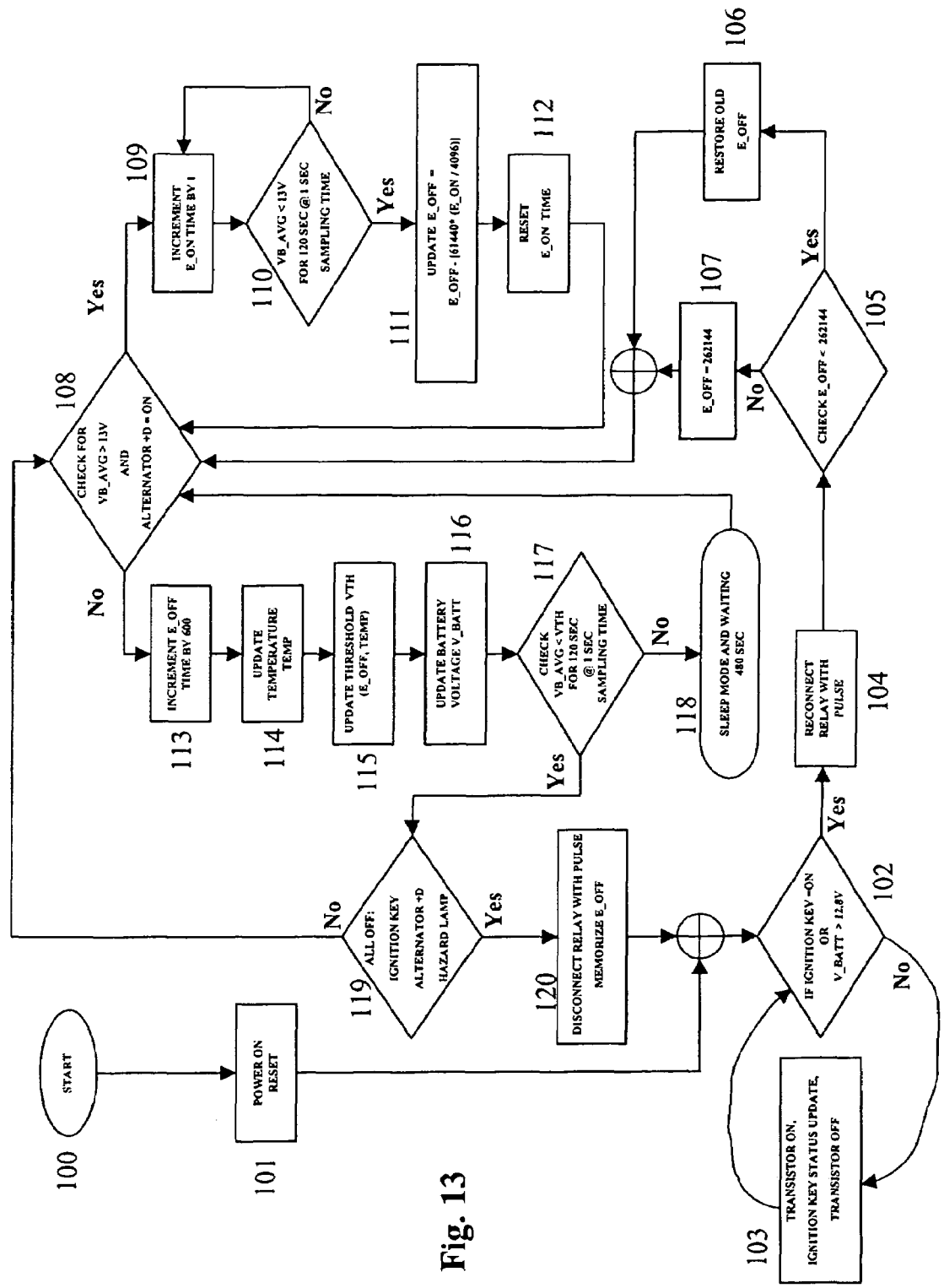
FIG. 13 is a simplified block diagram showing a possible implementation of the control logic of the protection device according to the invention.

FIG. 13 represents a block diagram describing a possible implementation of the control logic of the device according to the invention; in such a figure, block 100 represents the start block of the program.

When mounting and electrically connecting the device 1, with the contact 21 in the open condition, the initialization of the same device is performed, i.e. an initial configuration or "setup" of some variables of the program and/or the control logic, and in particular of the following ones:

VB_AVG: mean value of 4 successive readings of the battery voltage;

SOC: state of charge of the battery;

E_OFF: timer of the time passed with the motor off, initially set to a default value (in the case of the diagram of FIG. 13, the value of 262144) that takes into account the state of charge a battery can have when installed on a vehicle after a given time of storing;

E_ON: timer of the time passed with the motor on and with the battery recharge voltage greater than 13V, initially set to value 0.

Such an initialization phase is represented by block 101 of FIG. 13.

With the device 1 under condition of contact 21 being open, with the subsequent interruption of all loads of the vehicle, the control circuit provides for monitoring, for example every second, the battery voltage V_BATT, and the state of the ignition key of the vehicle. It is also updated the value of variable SOC, being indicative of the state of charge of the battery, which is calculated by the formula:

$$SOC = 100 \cdot \frac{(12,7 - V\_BATT)}{1,2} * 100\%$$

Considering said condition of contact 21 being open, and therefore of absence of voltage to various loads and/or auxiliary devices, in order to be able to supply the key and detect said condition of inserted ignition key, in parallel to the power contact there may be provided a suitable resistor (for example of 5,6 kohm) and a transistor, or other type of electrically controllable switch; the transistor is brought to the ON state by the micro-controller and remains in the ON state for the time being necessary for the micro-controller to perform the reading of the key state. Under this condition there is therefore supplied only a small electric current sufficient for the control of the various functions.

Said detecting operation is represented by block 103.

Turning back to block 102, when one of the following conditions is true (exit Yes):

(I) vehicle ignition key being inserted, or (II) battery voltage V_BATT greater than the value of 12,8 V the control electronics provides for reinstating the device 1, as per block 104, so as to allow the new supply of the on-board services of the vehicle.

Conditions (I) or (II) must occur for a certain number of consecutive times, typically 10 consecutive times within a defined time interval, for example 2 seconds (a reading every 200 ms); during the wait between a reading and the following one, the electronic circuit enter a rest condition, also said sleep-mode, in order to reduce the average consumption. The interval between a reading and the following one, that coincides with the duration of the time interval of said sleep-mode state, is generally reduced at the minimum, typically one second, for allowing to recognize, at the right time, insertion of the key and avoid annoying waits for the vehicle's driver.

It should be noticed that the occurrence of condition (II) alone is indicative of the presence of a "jump-start" connection, inasmuch as in said situation, with the vehicle which has not yet started, the battery voltage rises to a high value.

As said above, when one of the previous conditions (I) o (II) is true (block 102, exit Yes), a pulse is generated for reinstating the device 1 (block 104); said pulse has preferably a minimum duration of 75 msec and typically not greater than 250 msec.

At the end of the reconnection phase of the device 1, variable E_OFF is set to the value preceding the operation of opening of the relay or contact 21. Blocks 105–107 allow for limiting to a limit value (for example 262144) the value of E_OFF.

The system therefore provides to control whether the occurrence of one of conditions (I) o (II) is followed by a vehicle's motor ignition with a correct operation of the alternator. The control electronics reads every second the reading of signal V_BATT and calculates its mean value based on the last readings (for example 120 readings), for then storing it in the respective register VB_AVG.

Until the recharge mean voltage of battery VB_AVG is greater than 13V, this means that the alternator of the vehicle is able to recharge the battery, as per block 108, exit Yes. During the whole recharge time, counter E_ON is increased every second and memorizes the duration of the recharge time, as per block 109.

Thereafter, if the recharge mean voltage of the battery becomes lower than 13 V (block 110, exit Yes), this means that the alternator is no longer capable of recharging the battery.

The control software then updates variable E_OFF, as per block 111, which variable is decreased in function of the duration of the recharge time, according to the formula:

$$E\_OFF-[K1*(E\_ON/K2)]$$

K1 and K2 are two constant values which typically are k1=61440 and k2=4096, but they could have other values as a function of different conditions of use. The counter E_ON is then zeroed, as per block 112 and controls goes back to block 108.

If at block 108 the battery voltage mean VB_AVG is lower than 13V (exit No), as long as the alternator is not able to recharge the battery, an intervention threshold (block 115) is updated, in function of the ambient temperature TEMP read by the micro-controller of circuit 15 (block 114) and the time stored at E_OFF (block 113), said intervention threshold VTH (block 115) being defined by a table of the following type, which actually implements the curves cited with reference to FIG. 12:

| seconds | <0° C. | 0° C./40° C. | >40° C. |
|---|---|---|---|
| 0 | 11,320 | 11,470 | 11,580 |
| 256 | 11,320 | 11,470 | 11,580 |
| 4096 | 11,371 | 11,521 | 11,631 |
| 8192 | 11,422 | 11,572 | 11,682 |
| 12288 | 11,473 | 11,623 | 11,733 |
| 16384 | 11,524 | 11,674 | 11,784 |
| 20480 | 11,575 | 11,725 | 11,835 |
| 24576 | 11,626 | 11,776 | 11,886 |
| 28672 | 11,677 | 11,827 | 11,937 |
| 32768 | 11,728 | 11,878 | 11,988 |
| 36864 | 11,779 | 11,929 | 12,039 |
| 40960 | 11,830 | 11,980 | 12,090 |
| 45056 | 11,881 | 12,031 | 12,141 |
| 49152 | 11,932 | 12,082 | 12,192 |
| 53248 | 11,984 | 12,134 | 12,200 |
| 57344 | 12,035 | 12,185 | 12,200 |
| 61440 | 12,086 | 12,200 | 12,200 |
| 65536 | 12,137 | 12,200 | 12,200 |
| 131072 | 12,200 | 12,200 | 12,200 |
| 172800 | 12,200 | 12,200 | 12,200 |
| 270000 | 12,200 | 12,200 | 12,200 |

The system therefore verifies whether the mean voltage VB_AVG is lower than the cited intervention threshold (representative of the Cutout curve of FIG. 13), as per block 117; the cycle time during this phase is reduced to the more frequent 120 readings, for example spaced by one second; in the negative case (block 117, exit No), a longer wait time follows (for example 480 seconds), during which the electronics enters a sleep-mode in order to reduce the mean consumption, as per block 118. Should instead the battery mean voltage VB_AVG be lower than the threshold voltage VTH (block 117, exit Yes), the following conditions are simultaneously verified, in a known way (as per block 119, exit Yes—note that block 119 lists the first three conditions only):

1. ignition key not inserted,
2. lack of alternator signal,
3. emergency lamps off,
4. lack of door opening,
5. lack of actuation of brake pedal,
6. lack of activation of devices with remote control, (the above list could include verification of other particular predetermined conditions, differing for various vehicles and manufacturers). In presence of the above said conditions, the control electronics provides for causing contact 21 of device 1 to open, as per block 120, and memorizing the value of variable E_OFF. Control then returns to block 102. Vice-versa, should at least one of conditions 1., 2., 3. (as well as 4., 5., 6. and likely other ones, as said) of block 119 not occur (exit No), or should particular conditions of the vehicle be present, the control returns to block 108.

From the above description, as well as from the annexed claims which are an integral part of said description, the features of the present invention are clear. It is also clear that several variants are possible for the man skilled in the art to the system described by way of example, without departing from the spirit of the inventive idea.

The logic of operation of the system could be provided with a control for the automatic reinstatement if the voltage difference at the ends of power contact 21 exceeds a defined value (for instance 2V) for a given number of successive readings (for instance 10) and there are present at the same time the key signal and the signal of alternator on charge. This allows for warranting the reinstatement o re-closure of the relay in the case of accidental opening, as for example a significant crash during maneuvering.

In the described embodiment the bistable relay has a cylindrical shaped movable core; however, it is clear that the bistable relay could be of a different type, for instance having a movable anchor.

The device 1 can also be equipped with a simple circuit able to measure the internal resistance of the battery, which is a very important parameter for knowing the "state of health" o SOH (State of Health) of the battery. As it is known, in fact, with battery ageing, the internal resistance of the battery increase progressively; for example, the fact that such an increase exceeds by 50% the original value (i.e. when the battery was new) means that one or more battery elements are sulphatated and therefore deteriorated.

Measure of the battery internal resistance can be performed by a simplified circuit, constituted by a resistor having a low ohmnic value (for example 0.5 ohm) and an electronic switch, such as a solid state relay. Under condition of vehicle at rest the electronic circuit controls the conduction of a mosfet for few milliseconds: this causes a current peck and a corresponding voltage reduction, with known ways. In fact, provided that the device 1 according to the invention is pre-arranged for monitoring the battery voltage, its micro-controller could be also programmed for signaling if the battery reached the end of life, the life curves of a battery being known per se.

The electronic part of control and detection of the device 1 according to the invention, i.e., circuit 15, could be positioned outside the casing 2–3.

The device 1 could eventually integrate inside a crash sensor, for example of the inertial type, or have means for the connection to an external crash sensor, for example the control unit of an air-bag system.

Similarly, the device could integrate interchangeable fuses for high currents and this with the aim of protecting the vehicle from short-circuits of the supply cables downstream the device 1. The fuses could have a bayonet type mounting system, or a screw type mounting system.

It is also possible to provide for privileged supply lines being protected by means of self-restoring fuses, for example of the polymeric type.

The device can also be equipped with a serial interface, for example a CAN or LIN interface, for supplying diagnostic information such as SOC and SOH of the battery to a diagnostic node being present on the vehicle dashboard, or to a portable diagnosis terminal for workshops. By means of said serial connection the device could also receive information and could be partially re-configured.

According to a further variant embodiment it is possible to modify the algorithm for SOC determination, so as that it takes into account the real current supplied by the battery, the latter being possibly measured by means of a Hall effect current sensor.

What is claimed is:

1. A protection system of a battery of a vehicle, the vehicle having a motor, an ignition system (MA) of the motor, a battery (BA) used by the ignition system (MA) in order to start the motor, an alternator (AL) actuated by the motor in order to recharge the battery (BA) and at least one electric load (CS) supplied by the battery (BA), the protection system comprising a device (1) for electrically disconnecting or connecting the battery (BA) with respect to the electric load (CS), the device (1) having
    switch means (20, 21, 22) connected in series between the battery (BA) and the electric load (CS) and capable of assuming a closed condition and an open condition, the switch means comprising a movable contact (21) and actuation means (20, 22) which can be actuated in order to displace the movable contact (21),
    a microprocessor control circuit (15), comprising means for measuring at least one electrical quantity (V_BATT, VB_AVG) being representative of a state of charge of the battery (BA), comparator means for operating a comparison between a measured value of the electrical quantity (V_BATT, VB_AVG) and a respective threshold value (VTH), control means capable of controlling the actuation means (20, 22) as a function of the comparison performed by the comparator means, characterized in that
    the control circuit (15) further comprises means for detecting ambient temperature (TEMP), means for detecting time of inactivity of the motor (E_OFF), means for calculating a mean value of voltage (VB_AVG) of the battery,
    the electrical quantity (V_BATT, VB_AVG) is the mean value of voltage of the battery (BA),
    the threshold value (VTH) is variable in function of the ambient temperature (TEMP) and the time of inactivity of the motor (E_OFF),
    the actuation means comprise a bistable electromagnetic arrangement (20, 21, 22) capable of passing from a first stable condition to a second stable condition following a pulse generated by the control means.

2. The system according to claim 1, characterized in that the control circuit (15) comprises means for detecting the battery voltage (V_BATT).

3. The system according to claim 2, characterized in that the control circuit (15) comprises means for cyclically detecting a difference of voltage at the ends of movable contact (21).

4. The system according to claim 1, characterized in that the control circuit (15) comprises at least one of:
    means for acquiring or detecting a first signal being indicative of an active condition of the alternator (AL),
    means for acquiring or detecting a second signal being indicative of an active condition of the ignition system,
    means for measuring current distributed by the battery (BA), said means comprising in particular a Hall effect current sensor.

5. The system according to claim 4, characterized in that the control circuit (15) is operative for causing in an automatic way closure of the switch means (20, 21, 22) in case a difference of voltage at ends of the movable contact (21) exceeds a predefined value for a certain number of successive detections and the first and the second signal are simultaneously present.

6. The system according to claim 1, characterized in that the control circuit (15) comprises means for verifying the occurrence of a plurality of predetermined conditions and that the control circuit (15) is operative for causing in an automatic way the switch means (20, 21, 22) to open in case the mean voltage (VB_AVG) is lower than the threshold value and, at the same time, said plurality of predetermined conditions occurs, said predetermined conditions being preferably selected in the group comprising the following: ignition system not active, in particular lack of insertion of an ignition key, alternator not active, vehicle's emergency lamps not active, lack of opening of vehicle's doors, lack of actuation of a vehicle's brake, lack of activation of vehicle's remote control devices.

7. The system according to claim 1, characterized in that the control circuit (15) comprises means for measuring an internal resistance of the battery (BA), comprising in particular a low ohmnic value resistor and an electronic switch, in particular a solid state relay.

8. System according to claim 1, characterized in that the device (1) integrates, or is connected to, or comprises at least one of:
    a crash sensor,
    one or more fuses,
    a serial interface, in particular of CAN or LIN type, for connection of the control circuit (15) to an external electronic apparatus, the latter being in particular provided for
    receiving information detected by means of the control circuit (15) and/or
    sending information or configuration data to the control circuit (15).

9. The system according to claim 1, characterized in that the bistable electromagnetic arrangement (20, 21, 22) comprises
    an electromagnet (20), having an inductor winding (20A) provided with a magnetic yoke (20B), the ends of the winding (20A) being electrically connected to the control circuit (15);
    a movable armature (20C), susceptible of being displaced in two opposite directions as a function of the polarity of excitation of the electromagnet (20);
    an elastic element (22), operative for pushing the armature (20C) in a first position;
    a permanent magnet (20D), susceptible of attracting the armature (20C) in order to maintain it in a second position against the action of the elastic element (22), the movable contact (21) being preferably maintained in the closed position by means of the elastic element (22) and in the open position by means of the permanent magnet (22D), and being operatively associated to the armature (20C).

10. The system according to claim 9, characterized in that the armature is configured as one of a core (20C) capable of linear movement and an anchor capable of angular movement.

11. The system according to claim 9, characterized in that the movable contact (21) is supported by the armature (20C) with movement capability with respect to the latter.

12. The system according to claim 1, characterized in that the device (1) comprises a casing realized by at least two parts (2, 3) mutually coupled in a sealed way, within which at least one of the bistable electromagnetic arrangement (20, 21, 22) and the control circuit (15) is housed.

13. The system according to claim 1, characterized in that a covering element (5) is associated to a casing (2, 3) of the device, for two terminals (T1, T2) for connection of the device (1), the covering element (5) comprising a hooking part (6) and a closing part (7), mutually joined by means of an elastically deformable portion (8), acting as a hinge.

14. The system according to claim 1, characterized in that the device (1) comprises manually actuated commutation means (12) being operatively associated to the control circuit (15) and provided for manually controlling, should the need arise, passage of the movable contact (21) from a respective first position to a respective second position, or vice versa.

15. The system according to claim 1, characterized in that a vent device (14–14D) is associated to a casing (2, 3) of the device, operative for avoiding significant increases of pressure within the casing itself, the vent device (14–14D) comprising preferably a membrane (14B) of a material being permeable to air and impermeable to water and humidity.

16. The system according to claim 12, characterized in that the control circuit (15) is at least partly mounted on a board having a plurality of through-holes (15A), some of said holes being designed for receiving ends of respective positioning pins (16) which rise from the casing (2,3), and some others of said holes being designed for cooperating with fixing means (17) in order to fasten the board to the casing (2, 3).

17. The system according to claim 1, characterized in that the device (1) comprises two connection terminals (T1, T2) connected to the control circuit through respective connection elements made of electrically conductive material (24, 25), which are at least in part wrapped by material constituting a casing (2, 3) of the device, each connection element (24, 25) being preferably obtained by a shaped metallic strap or small bar.

18. The system according to claim 17, characterized in that each connection element (24, 25) comprises a first end portion (26) to which a respective terminal (T1, T2) is fixed, a second end portion (27) for connection to the control circuit (15), a median portion (28) that extends between the end portions (26, 27), an intermediate contact portion (29) capable of cooperating with the movable contact (21) the median portion (28) being preferably at least partially surrounded by material constituting a wall of the casing (2).

19. The system according to claim 17, characterized in that at least a part (28A) of the median portion (28) has recesses or projections (28B) defining a labyrinth apt for cooperating with said material in order to eliminate possible water and humidity infiltrations towards the inside of the casing (2, 3), a thermoplastic material being preferably molded with or over said part (28A), which is in turn wrapped by material constituting said wall of the casing (2, 3).

20. The system according to claim 1, characterized in that the device (1) comprises two connection terminals (T1, T2), to at least one of which there is electrically associated a conductor (30) having at least a portion protruding outside a casing (2) of the device, to realize a jump start contact, i.e., a fixing point for a clamp of an electric cable for connection to an auxiliary starting system of the vehicle.

21. The system according to claim 20, characterized in that said portion passes through an aperture (6B) of a movable covering element (5) for two connecting terminals (TI, T2) of the device (1), said portion being accessible when the movable covering element (5) is in a respective open position.

* * * * *